3,155,659
PHOSPHONIC DIAMIDES AND METHODS
OF MAKING SAME
Edward N. Walsh, Chicago Heights, Ill., assignor to
Stauffer Chemical Company, a corporation of Delaware
No Drawing. Filed Feb. 16, 1959, Ser. No. 793,247
13 Claims. (Cl. 260—247.5)

This invention relates to new phosphonic diamides, and methods of preparing same. More specifically, this invention relates to methods of preparing secondary amides having the formula

wherein $Y_1$ and $Y_2$ are the same or different secondary amino groups from the class consisting of alkylamino groups and heterocyclic amino groups with nitrogen in the ring.

These products may be prepared by reacting a phosphorous triamide with phosphorous acid, such as follows:

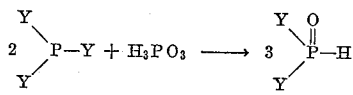

This reaction produces high yields and a product of high purity. The Y substituents may be different or the same in this equation.

The $Y_1$ and $Y_2$ substituents in the new phosphonic diamides having the formula

may be the same or different alkyl secondary amino groups, including lower alkyl secondary amino groups such as exemplified by dimethyl amino, diethyl amino, dipropylamino, dibutylamino, diamylamino, dioctylamino groups, and the like. Thus, my phosphonic diamides may have the same lower alkylamino groups or mixed groups such as methyl ethyl amino and ethyl butyl amino groups. Alternatively, $Y_1$ and $Y_2$ may be the same or different heterocyclic amino groups with nitrogen in the ring, such as illustrated by piperidino, morpholino, and pyrrolidino groups.

The phosphorous triamides which serve as a starting material in my method may be conveniently prepared by reacting one mole of phosphorus trichloride with at least six moles of the desired secondary amine. For example, in the case of dimethylamine, the reaction proceeds as follows:

$6(CH_3)_2NH + PCl_3 \rightarrow [(CH_3)_2N]_3P + 3(CH_3)_2N \cdot HCl$

This type of reaction is disclosed by Michaelis, Ann., 326, 129 (1903), and in U.S. Patent 2,151,380. Both the aliphatic and heterocyclic secondary amines are available commercially and are suitable for use in this form. Phosphorous acid is also available commercially or it may be prepared by reacting three moles of water with one mole of phosphorous trichloride.

The following examples serve to illustrate the preparation of my new phosphonic diamides.

*Example I*

35.2 grams of hexamethyl phosphorous triamide were added to a flask equipped with thermometer and stirring rod. 13.8 grams of phosphorous acid were then added to the flask with constant stirring over a period of 36 minutes while keeping the temperature below 40° C. with external cooling. The mixture was then stirred an additional thirty minutes at 35° C., warmed to 40° C. for fifteen minutes, warmed to 60° C. for fifteen minutes, and then allowed to stand overnight at room temperature. The mixture was then distilled under reduced pressure to give 30.1 grams of product boiling at 72° C. at a pressure of 1.5–2.0 mm. of mercury. The product, phosphonic tetramethyl diamide, had an index of refraction of $n_{25}{}^D = 1.4518$, and analyzed as follows:

| Elements | Theory, percent | Analysis, percent |
|---|---|---|
| P | 22.8 | 22.4 |
| N | 20.6 | 20.8 |
| Cl | 0.0 | Nil |

*Example II*

Using an apparatus and procedure similar to Example I, above, a slurry of 4.1 gms. of phosphorous acid in 24.7 gms. of phosphorous hexaethyl triamide was stirred under a dry nitrogen atmosphere and heated to 60° C. for 21 minutes. The phosphorous acid dissolved to give a clear solution. The heating was continued for 38 minutes to a temperature of 95° C., after which it was cooled and distilled. A fraction boiling at 120° C. under pressure of 6 mm. of mercury weighed 4.8 gms., and had an index of refraction of $n_{25}{}^D = 1.4545$. This product, phosphonic tetraethyl diamide, analyzed as follows:

| Elements | Theory, percent | Analysis, percent |
|---|---|---|
| P | 16.1 | 15.9 |
| N | 14.6 | 14.6 |

*Example III*

Using an apparatus and procedure similar to Example I, above, 3.1 gms. of phosphorous acid were added to 31.4 gms. of hexabutyl phosphorous triamide at 25–30° C. during a 30 minute period. The reaction was exothermic, thus requiring cooling. The mixture was held an additional 22 minutes at 27–30° C., thereby forming a hazy solution. It was then heated to 50° C. for one hour and cooled. It was then filtered to give 31.7 gms. of phosphonic tetrabutyl diamide, which had an index of refraction of $n_{25}{}^D = 1.4579$. 5 grams of this product were distilled, with some decomposition, at 140° C. at 0.1 mm. of mercury to give 1.6 gms. of a product having an index of refraction of $n_{25}{}^D = 1.4560$. The product, phosphonic tetrabutyl diamide, analyzed as follows:

| Elements | Theory, percent | Analysis, percent |
|---|---|---|
| P | 10.2 | 9.6 |
| N | 9.2 | 8.7 |

In the preceding examples the yields on distillation were lowered due to decomposition during distillation. This does not indicate that the starting materials were impure. On the contrary, there was very little difference chamically between the distilled and undistilled products.

*Example IV*

A suspension of 4.1 gms. of phosphorous acid in 28.9 gms. of phosphorous trimorpholide and 100 ml. of benzene were heated at reflux temperatures of 81–82° C. for 15 hours. A nearly clear solution resulted. This solution was filtered and concentrated by distillation under reduced pressure to 70° C. at 2 mm. of mercury. 31.2 grams of low melting, solid, hygroscopic product resulted. This product, phosphonic dimorpholide, analyzed as follows:

| Elements | Theory, percent | Analysis, percent |
|---|---|---|
| P | 14.2 | 13.0 |
| N | 12.7 | 13.5 |

My method, as illustrated above, produces no by-products. The purity of the final product is dependent upon the stoichiometric accuracy of the amounts of reactants. Therefore, exact stoichiometric proportions are preferred. The proportions are not critical, however, because the reaction will proceed in the presence of an excess of either reactant, but the product produced will be contaminated with the excess reactant, thus creating a problem of physical separation.

The temperatures at which my method take place are not critical. They should be high enough so the the phosphorous acid will go into solution and low enough so that there is no decomposition of the reactants and/or product. Generally, a range of temperatures between room temperature and 150° C. is satisfactory. As indicated in the examples above, the initial solution and reaction generally take place in the range of 25–60° C. with the reaction being completed at 50–100° C. The final product may be maintained at reaction temperatures after completion of the reaction without causing decomposition or side reactions because no by-products are normally produced; purification is often unnecessary.

Likewise, the time of reaction is not critical, but it will of course vary with the temperature. At the temperatures indicated above, the reaction is usually complete in about one to two hours, but it reaches substantial completion as soon as the phosphorous acid has gone into solution.

The phosphonic diamides prepared by the method of this invention are new, valuable chemical intermediates which may be used to make a variety of compounds. Thus phosphonic tetramethyl diamide may be converted to phosphoric tetramethyl diamido chloride, which in turn is easily converted to octamethyl pyrophosphoramide according to the process of U.S. Patents 2,706,738 and 7,717,249; this latter compound is a well-known useful insecticide. In a similar manner, phosphonic diamides in general may be converted to the corresponding phosphonic diamido chlorides. Phosphonic diamido chloride compounds, such as

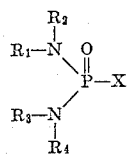

wherein X is halogen and $R_1$, $R_2$, $R_3$ and $R_4$ are alkyl groups with 1–5 carbon atoms, are shown in U.S. Patent 2,613,224 to be valuable intermediates for insecticides, particularly systemic aphicides.

The following example illustrates the preparation of a diamido chloride from the diamide.

Example V 20.0 grams of N-chlorosuccinimide were added, with stirring, to a solution of 20.4 gms. of phosphonic tetramethyl diamide at 25–30° C. After the addition was complete, the mixture was stirred for 16 hours at room temperature. The by-product, succinimide, was removed by filtration and the filtrate was distilled to yield 17.4 gms. of phosphoric tetramethyl diamido chloride boiling at 80–91° C. at a pressure of 1 mm. of mercury. The product analyzed as follows:

| Elements | Theory, percent | Analysis, percent |
|---|---|---|
| P | 18.2 | 17.7 |
| N | 16.4 | 15.6 |
| C | 20.8 | 21.8 |

This product, phosphoric tetramethyl diamido chloride, may be converted to octamethyl pyrophosphoramide as follows.

Example VI

To 94.5 gms. (0.554 mol) of bis(dimethylamido) phosphoryl chloride, there were added 10 gms. (0.55 mol., 100% excess) water. The temperature rose to 39° C. Then 56.5 gms. (0.559 mol., 1% excess) of triethylamine were added during a two minute period. The temperature was maintained between 40 to 45° C. for two hours. Then 100 ml. of carbon tetrachloride were added and the slurry stirred for one hour. It was filtered to remove the solid amine hydrochloride salt. The carbon tetrachloride was removed by distillation. The liquid residue, octamethyl pyrophosphoramide, weighed 73.2 gms., representing a 92.5% yield and had a refractive index of $n_{25}^D$ of 1.4620 at 25° C. Upon distillation, the crude liquid yielded 84% of substantially pure product, which analyzed 21.3% P and 19.4% N as compared to the calculated values of 21.6% P and 19.6% N.

The foregoing detailed description has been given for clearness of understanding only, and no unnecessary limitations should be understood therefrom, as modifications will be obvious to those skilled in the art.

I claim:

1. A product having the formula

wherein $Y_1$ and $Y_2$ are secondary amino groups from the class consisting of alkyl secondary amino wherein each alkyl substituent has up to 8 carbon atoms in the chain, piperidino, morpholino, and pyrrolidino.

2. The product of claim 1 wherein $Y_1$ and $Y_2$ are alkyl secondary amino and the alkyl substituents thereof have up to 8 carbon atoms in the chain.

3. The product of claim 1 wherein $Y_1$ and $Y_2$ are piperidino.

4. The product of claim 1 wherein $Y_1$ and $Y_2$ are pyrrolidino.

5. Phosphonic tetramethyl diamide.
6. Phosphonic tetraethyl diamide.
7. Phosphonic tetrabutyl diamide.
8. Phosphonic dimorpholide.
9. The method of preparing phosphonic di-(secondary amides) having the formula:

wherein $Y_1$ and $Y_2$ are secondary amino groups from the class consisting of alkyl secondary amino wherein each alkyl substituent has up to 8 carbon atoms in the chain, piperidino, morpholino, and pyrrolidino, which consists of reacting substantially stoichiometric quantities of a phosphorous tri (secondary) amide with phosphorous acid at a temperature between room temperature and approximately 150° C.

10. The method of preparing phosphonic tetramethyl diamide which consists of reacting substantially stoichiometric proportions of hexamethylphosphorous triamide with phosphorous acid at a temperature between room temperature and approximately 150° C.

11. The method of preparing phosphonic tetraethyl triamide which consists of reacting substantially stoichiometric proportions of phosphorous hexaethyl triamide with phosphorous acid at a temperature between room temperature and approximately 150° C.

12. The method of preparing phosphonic tetrabutyl diamide which consists of reacting substantially stoichiometric proportions of hexabutyl phosphorous triamide with phosphorous acid at a temperature between room temperature and 150° C.

13. The method of preparing phosphonic dimorpholide which consists of reacting substantially stoichiometric proportions of phosphorous trimorpholide with phosphorous acid at a temperature between room temperature and approximately 150° C.

References Cited in the file of this patent

UNITED STATES PATENTS

| | | |
|---|---|---|
| 2,146,543 | James et al. | Feb. 7, 1939 |
| 2,160,841 | Dreyfus | June 6, 1939 |
| 2,160,842 | Dreyfus | June 6, 1939 |
| 2,487,859 | Dickey et al. | Nov. 15, 1949 |
| 2,648,706 | Lewis et al. | Aug. 11, 1953 |
| 2,671,109 | Hartley et al. | Mar. 2, 1954 |
| 2,676,962 | Lewis et al. | Apr. 27, 1954 |
| 2,678,334 | Hartley et al. | May 11, 1954 |
| 2,678,335 | Lester | May 11, 1954 |
| 2,717,249 | Toy et al. | Sept. 6, 1955 |
| 2,752,392 | Saul et al. | June 26, 1956 |
| 2,848,475 | Schmidt | Aug. 19, 1958 |
| 2,957,931 | Hamilton et al. | Oct. 25, 1960 |

OTHER REFERENCES

Goldschmidt et al.: Justus Liebig's Annalen, vol. 588, pages 26, 30 and 33 (1954).